Aug. 27, 1957    J. A. PIERCE    2,804,616
MECHANICAL INDICATOR PLOTTING BOARD FOR LORAN NAVIGATION
Filed April 16, 1946    2 Sheets-Sheet 2

INVENTOR
JOHN A. PIERCE

BY   *M. O. Hayes*

ATTORNEY

2,804,616

MECHANICAL INDICATOR PLOTTING BOARD FOR LORAN NAVIGATION

John A. Pierce, Cambridge, Mass., assignor, by mesne assignments, to the United States of America as represented by the Secretary of the Navy Application April 16, 1946, Serial No. 662,461

4 Claims. (Cl. 343—112)

This invention relates to apparatus for recording the track of a ship or other moving objects, and more particularly to apparatus for recording such a track in response to the adjustment of two long range navigation receivers.

In patent application Serial No. 599,163, filed June 13, 1945, of J. A. Pierce, D. E. Kerr, and J. C. Street, now Patent No. 2,689,346, is disclosed a long range navigation system which enables a navigator to locate himself on the surface of the earth. This system comprises broadly two pairs of spaced pulse transmitters, one transmitter of each pair having though not necessarily the same location and a receiver for the transmitted pulses with the necessary timing and indicating equipment at the point to be located. The difference in arrival time of corresponding pulses from each pair of transmitters is measured. With this information and information as to the time relation of the corresponding pulses from each pair of transmitters, a location may be established along two spherical hyperbolas having their foci at respective pairs of transmitters. The intersection of these hyperbolas will fix the position of the receiver.

In practice, charts of the area of interest are prepared having the family of spherical hyperbolas plotted thereon corresponding to each pair of transmitters. The hyperbolas are ordinarily chosen to correspond to a time difference in even hundred microseconds as measured thereon, and thus the spacing between adjacent hyperbolas of a family will correspond to an incremental time delay of 100 microseconds. Using these charts the navigator at the receiver has only to measure the arrival time difference of the corresponding pulses from each pair of transmitters, and then determine the receiver position by interpolating the distance between the two adjacent hyperbolas of each family nearest to the measured arrival time difference for that family. At times whose intervals are determined by the speed of the ship measurements may be taken, and locations corresponding thereto determined on the charts to permit a track of the ship to be plotted thereon. While this proceduce is routine, there will obviously be some delay between the time of taking the measurements and the determination of the position. In relatively slow moving ships such as water craft this delay will ordinarily be of little importance. However in fast moving ships such as aircraft this delay may amount to several miles of distance travelled, and where it is necessary to accurately determine the position for bombing a correction will be necessary.

Long range navigation receivers as disclosed in the above mentioned application have a 1000 microsecond delay multivibrator in the path timing the sweep for the control or "master" transmitter pulse and an adjustable delay multivibrator circuit in the path timing the sweep for the controlled or "slave" transmitter pulse. This circuit comprises a coarse delay multivibrator having a range of 1000 to 11,000 microseconds adjustable in steps of 500 microseconds and a fine delay multivibrator adjustable over a range of 200 to 700 microseconds. The circuit multivibrators have their delay adjusted by potentiometers to time the sweeps for the respective pulses from the "master" and "slave" stations to permit these pulses to be superimposed on the visual indicator. Thus the settings of the potentiometers in the circuit multivibrators will be a mechanical indication of the measured arrival time delay of the "master" and "slave" transmitter pulses.

In the disclosed embodiment of the invention a plotting board is provided having its tracer independently movable in a direction tangent to one of each family of hyperbolas. Two receivers with the necessary timing and indicating apparatus are used—one to measure the difference in arrival time from one pair of transmitters and the other to measure the difference in arrival time from a second pair of transmitters. The adjustment of the fine delay multivibrator of each receiver is fed into the board to move the tracer in accordance with the adjustment of each receiver multivibrator. If the tracer is properly positioned with respect to a position on the board corresponding to the settings of the coarse delay multivibrators of each receiver and the movement of the tracer is properly calibrated with respect to the adjustment of each potentiometer, the tracer will move in accordance with the track of the ship as determined by the receivers.

It is accordingly an object of this invention to provide apparatus for instantaneously and automatically recording the track of a ship or other moving object in response to the adjustment of two long range navigation receivers.

It is a further object of this invention to provide a plotting board for instantaneously and automatically recording the track of a ship or other moving object in response to mechanical movements fed into said board.

Other and further objects will appear during the following description together with the accompanying drawing where:

Fig. 1 is a block diagram of the invention;

Fig. 2 is a circuit diagram of a block in Fig. 1;

Figure 3:
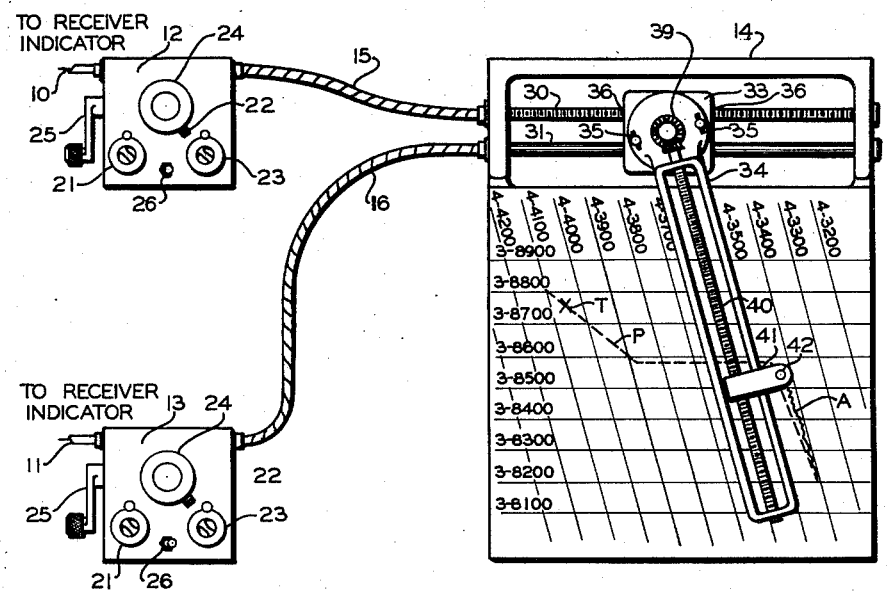
Fig. 3 is a plan view of the control boxes and plotting board.

Referring now to Fig. 1 the blocks 10 and 11 each represent a long range navigation receiver-indicator, which are tuned in frequency and recurrence rate to respective pairs of transmitters. Control boxes 12 and 13 contain the potentiometers for adjusting the fine delay multivibrators to maintain the pulses superimposed on the visual indicators, and also contain the necessary calibrating circuits. The movable arms of the potentiometers are each mechanically linked to plotting board 14 as indicated by dotted lines 15 and 16.

The circuit of one of the control boxes is disclosed in Fig. 2. A switch 18 is provided on the corresponding receiver-indicator, which in the normal position connects the grid of the first tube of the fine delay multivibrator with its potentiometer, that is, the potentiometer normally used. The first tube of the multivibrator is the one whose grid potential is adjustable to control the delay of the multivibrator. This permits the receiver-indicator to operate without the plotting board. The other position of switch 18 connects potentiometer 24 to the grid of the first tube of the fine delay multivibrator, and the multivibrator is controlled in manner exactly as before. It is to be noted that the delay is not measured by the adjustment of this potentiometer, but by markers, which accompany the pulses on the sweep traces of the visual indicator as described in the above mentioned application. Accordingly, the amount of rotation of the arm of potentiometer 24 to produce a given change in delay may be altered as desired. This is effectively accomplished by variable calibrating resistors 21 and 23. Ganged resistors 21 are known as the Minimum Adjustment, and are used to establish the initial point of the track on the board with the arm of potentiometer 24 in its minimum position. Resistor 23 is known as the scale adjustment, and is used to provide the desired delay for a given amount of rotation of the arm of potentiometer 24 by crank 25, with a resulting transfer of this rotation to the plotting board over a linkage as indicated by dotted line 15. To insure this rotation being transferred in the desired direction a reversing switch 26 is provided, which changes the direction of the voltage applied to the resistance coil of potentiometer 24. A clutch 22 is inserted in linkage 15 to permit this linkage to be broken as desired for independent adjustment of the plotting board tracer and the arm of potentiometer 24.

Figure 4:
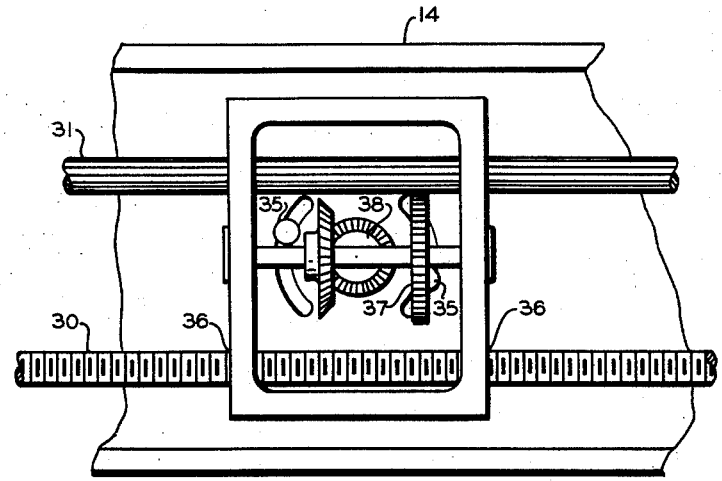
Fig. 4 is a bottom view of a portion of the plotting board in Fig. 3.

The plotting board is disclosed in Fig. 3 linked with the two control boxes. The dials and switch toggles on the control boxes are indicated by the same numerals as the resistors and contacts that they control in Fig. 2. Flexible shafts 15 and 16 link the arms of the potentiometer 24, which are controlled by the corresponding cranks 25, with shafts 30 and 31 respectively on the plotting board. Shaft 30 has a screw thread thereon, which is geared to nuts at 36 in carriage 33, and thus when rotated through this train of gears moves the carriage longitudinally across the board. An arm 34 is pivotally mounted on the carriage to permit angular adjustment with the edges of the board. Wing nuts 35 are provided to maintain when tightened the arm in its adjusted position. Shaft 31 is geared to pinion 37 as shown in Fig. 4 to transmit the rotary motion to this pinion and yet permit longitudinal motion of the carriage. Crown gearing 38 and 39 transmit this motion to a screw shaft 40 longitudinally and rotatably mounted on arm 34. A carriage 41 is slidably mounted on the arm to move longitudinally therewith. A nut on carriage 41 cooperates with the screw threads on shaft 40 to move the carriage in response to rotation of shaft 40 and also through the train of gears in response to rotation of shaft 31. A tracer, preferably having its pressure adjustable, is mounted in opening 42 to plot on the surface of the board the path of its movement about the surface. It is to be noted that crown gearing 39 is mounted at the pivoting axes of arm 34 so as not to interfere with adjustment of the arm.

In operation a chart of the area of interest is secured on the board as shown with one set of hyperbolas, which are substantially straight lines for small areas, parallel to the upper or lower edge of the board. If, however, the curvature of the hyperbolas is sufficient to prevent the desired accuracy, the hyperbolas may be plotted as straight lines with the distances on the chart distorted. In the example illustrated in Fig. 3 these lines represent the difference in pulse arrival time from a pair of transmitters having a pulse recurrence rate designated as 3, whose pulse emissions would be received on receiver-indicator 11 used in conjunction with control box 13. The other set of hyperbolas, which represent the difference in pulse arrival time from a pair of transmitters having a pulse recurrence rate designated as 4 whose emissions are received on receiver-indicator 10 in conjunction with control box 12, will extend at some angle with respect to the upper or lower edge of the board. Arm 34 is adjusted by loosening wing nuts 35 to extend parallel to these lines. Thus the tracer at 42 is free to move parallel to either family of hyperbolas.

The fine delay multivibrator as used in the receiver of the above mentioned application has a delay of 200 to 700 microseconds. However, this limited range is due to the voltage range of the potentiometer circuit used therewith. With potentiometer circuits of greater voltage range, the workable upper limit of the range of the multivibrator may be increased to 1600 microseconds. The potentiometer 24 and the associated resistors increase the upper delay limit to this value of 1600 microseconds. With this increased range the practical limitations involved in the design of delay multivibrator circuits which are to be strictly linear make it advisable to avoid minimum delays of 100 to 200 microseconds. Preferably the multivibrator with increased range should be only operated with a minimum delay setting of 400 microseconds to give a workable range of 400 to 1600 microseconds.

The procedure to adjust the control boxes preliminary to plotting and the actual plotting procedure will now be described. For the purpose of adjustment the coarse delay multivibrators may be neglected, since they furnish a delay in steps of 500 microseconds and are not used in the plotting except to add their delay in steps to that produced by the fine delay multivibrators. In the example chosen it is desired to plot over an area embraced by hyperbolas 3-8100 to 3-8800 and 4-3400 and 4-4000, the number preceding the hyphen indicating the rates of the corresponding pair of transmitters and the number following indicating the time difference in microseconds existing at that particular hyperbola. With the horizontal family of chart lines parallel with the upper or lower edge of the board and arm 34 adjusted parallel to the other family of lines, adjust control box 13 by connecting it to its delay multivibrator by switch 18, and turn crank 25 to bring the fine delay potentiometer connected thereto to its minimum position. With clutch 22 free, crank the flexible shaft from control box 13 until the tracer is set on line 3-8100, and then engage clutch 22. Rotate the crank slightly to ascertain whether the delay measurement readings on the visual indicator increase with the readings on the chart. If not, reverse the position of switch 26 and then return the tracer to line 3-8100. Now set the minimum adjustment 21 on the control box so that the delay measurement readings on the visual indicator correspond as nearly as possible to 600 microseconds, this being the amount necessary to add to the coarse multivibrator settings of 7500 microseconds to equal 8100 microseconds. The crank is now rotated until the tracer rests on the 3-8800 line. The delay measurements on the visual indicator should now be somewhere near the 1300 microsecond mark. If not, adjust scale adjustment 23 until this is exactly so. The tracer is then returned to line 3-8100 and the excursion repeated until the correct measurements at each of lines 3-8100 and 3-8800 are obtained on the visual indicator. In practice two excursions will ordinarily be sufficient. The above procedure is now repeated for alignment of control box 12 with respect to lines 4-3400 and lines 4-4000.

Done in this manner the alignment will give best correspondence at the two limits. If accuracy around a target is desired, it is desirable to make the correspondence more accurate in its immediate neighborhood. Assume in the illustration above the target at T from a rate 3 point of view was 3-8750 with line P as the path of approach. Alignment would then be made at 8750 as the upper limit, endeavoring to begin a high correspondence, at say 8600, the check point. A slight readjustment of either minimum or scale factor would serve to do this. The greatest departure between visual indicator and chart readings would then be expected at the lower limit of this rate, namely at the 3-8100 line.

After adjustment of the control boxes each receiver-indicator is operated with switch 18 connecting the fine delay multivibrator with its normal potentiometer, with the readings being taken from the visual indicators and such knowledge being transferred to the charts. When the area which is to be tracked is reached as determined from the charts, the switch 18 is thrown to connect control boxes 12 and 13 into their respective receiver-indicators. The operator rotates the cranks of control boxes 12 and 13 to maintain the pulses from the respective pair of stations superimposed on the visual indicator exactly as before. Only now the cranks 25 are substituted for the fine delay potentiometers. The tracer moving in accordance with cranks 25 will make the actual track of the ship as shown by line A in Fig. 3. This plotted track may be compared with proposed track P, and any necessary corrections made in the course of the ship.

The scope of the invention is defined in the following claims.

What is claimed is:

1. In combination with two long range navigation receiver-indicators responsive to a plurality of pairs of transmitters, each of said receiver-indicators including means movable to superimpose corresponding pulses from respective pairs of transmitters on its visual indicator, a generally rectangular plotting board having an arm movable in a direction parallel to an edge of said board and angularly adjustable with respect to said edge, a tracer on said arm and movable longitudinally therewith, mechanical connections linking said arm and said tracer with the respective movable means in said receiver-indicators to move said arm and said tracer in accordance with the motion of each movable means, and means for calibrating each of the movable means to the desired scale of said board.

2. In combination with two long range navigation receiver-indicators responsive to a plurality of pairs of transmitters, each of said receiver-indicators including a potentiometer, a delay circuit controlled by said potentiometer to permit corresponding pulses from the respective pairs of transmitters to be superimposed on the visual indicator, a generally rectangular plotting board having an arm movable in a direction parallel to an edge of said board and angularly adjustable with respect to said edge, a tracer on said arm and movable longitudinally therewith, flexible shafts linking the arms of the respective potentiometers with said board, trains of gears controlling the movement of said arm and said tracer thereon in accordance with rotation of said shafts, and means for calibrating each of the potentiometers to the desired scale of said board.

3. Apparatus for plotting the course of a moving craft on which said apparatus is mounted, comprising, in combination, two long range radio navigation receiver-indicators, each of which includes a delay multivibrator in which adjustments of a bias voltage of one tube of each functions to superimpose corresponding pulses from respective pairs of stationary transmitters on its visual indicator, a pair of potentiometers whose arms are movable for respectively adjusting said bias voltages, a plotting board having an arm movable parallel with an edge of said board, a tracer movable along said arm, means for mechanically connecting the arm of said plotting board to the arm of one of said pair of potentiometers and the tracer of said plotting board arm to the arm of the second of said pair of potentiometers for concurrent adjusting said arm and said tracer with the arms of said first and second potentiometers respectively.

4. Apparatus for plotting the course of a moving craft on which said apparatus is mounted, comprising, in combination, two long range radio navigation receiver-indicators, each of which includes a delay multivibrator in which adjustments of a bias voltage from one tube of each functions to superimpose corresponding pulses from respective pairs of stationary transmitters on its visual indicator, a pair of potentiometers whose arms are movable for respectively adjusting said bias voltages, a plotting board having an arm movable parallel with an edge of said board, means for adjusting the angle of said arm relative to said edge of said board, a tracer movable along said arm, means for mechanically connecting the arm of said plotting board to the arm of one of said pair of potentiometers and the tracer of said plotting board arm to the arm of said second of said pair of potentiometers for concurrently adjusting said arm and said tracer with the arms of said first and second potentiometers respectively.

References Cited in the file of this patent
UNITED STATES PATENTS

| | | |
|---|---|---|
| 2,191,730 | Sjostrand | Feb. 27, 1940 |
| 2,299,083 | Elm | Oct. 20, 1942 |
| 2,365,949 | Greene | Dec. 26, 1944 |
| 2,530,428 | Gray | Nov. 21, 1950 |